(12) United States Patent
Parthasarathy (10) Patent No.: US 7,447,656 B2
(45) Date of Patent: Nov. 4, 2008

(54) ELECTRONIC LENDING AND BORROWING SYSTEM

(76) Inventor: Medha Parthasarathy, 33 B Jolly Maker Apt 1, cuffe Parade, Colaba, Mumbai (IN)

( * ) Notice: Subject to any disclaimer, the term of this patent is extended or adjusted under 35 U.S.C. 154(b) by 1201 days.

(21) Appl. No.: 09/929,939

(22) Filed: Aug. 15, 2001

(65) Prior Publication Data
US 2003/0036993 A1  Feb. 20, 2003

(51) Int. Cl.
*G06Q 40/00* (2006.01)
(52) U.S. Cl. ............... 705/38; 705/35; 705/36; 705/37; 709/204; 710/105; 707/10; 370/427; 726/13
(58) Field of Classification Search ............ 705/35–38; 707/10; 709/204; 710/105; 370/427; 726/13
See application file for complete search history.

(56) References Cited

U.S. PATENT DOCUMENTS

| | | | |
|---|---|---|---|
| 5,611,052 A | 3/1997 | Dykstra | |
| 5,699,527 A | 12/1997 | Davidson | |
| 5,742,775 A | 4/1998 | King | |
| 5,797,133 A | 8/1998 | Jones | |
| 5,832,462 A | 11/1998 | Midorikawa | |
| 5,913,202 A | 6/1999 | Motoyama | |
| 5,930,776 A | 7/1999 | Dykstra | |
| 5,940,812 A * | 8/1999 | Tengel et al. | 705/38 |
| 5,966,699 A | 10/1999 | Zandi | |
| 6,029,149 A | 2/2000 | Dykstra | |
| 6,148,293 A | 11/2000 | King | |
| 6,151,588 A | 11/2000 | Tozzoli | |
| 6,208,979 B1 | 3/2001 | Sinclair | |
| 6,260,024 B1 * | 7/2001 | Shkedy | 705/37 |
| 6,366,892 B1 * | 4/2002 | Altman et al. | 705/38 |
| 6,778,968 B1 * | 8/2004 | Gulati | 705/36 R |
| 2002/0138413 A1 * | 9/2002 | Creamer et al. | 705/38 |
| 2003/0028479 A1 * | 2/2003 | Kirksey | 705/38 |
| 2003/0033240 A1 * | 2/2003 | Balson et al. | 705/37 |

* cited by examiner

*Primary Examiner*—Harish T. Dass
(74) *Attorney, Agent, or Firm*—Lowe, Hauptman, Ham & Berner, LLP (57) ABSTRACT

A common forum for borrowing and lending includes a plurality of remote devices associated with respective potential counterparts, a communications network for permitting communication between the remote devices, and a central server computer. Each user enters preferences and data pertaining to what he or she would like to lend or borrow and under what conditions. The central server computer then uses the preferences of lending and borrowing data from each user to identify possible counterparts that might be mutually acceptable based on the preference information. Once a match occurs, the potential counterparts can negotiate through the central server to negotiate some or all terms. After the negotiation is complete, the forum will reveal the counterpart details to both the parties of contract for settlement.

46 Claims, 9 Drawing Sheets

ELECTRONIC LENDING AND BORROWING SYSTEM

BACKGROUND OF THE INVENTION

1. Field of the Invention

This invention relates to an apparatus and method for matching a potential lender with a potential borrower. More specifically, the present invention involves enabling a potential money lender and potential borrower to provide specific loan terms, the range of acceptable loan terms, and a listing of negotiable loan terms.

2. Description of Related Art

Currently, the Depositors (lenders) and the borrowers of money mainly transact through recognized financial institutions, most often Banks, or other financial institutions. These Banks are regulated by the respective Central Banks of the country which prescribe rules and regulations to these Banks to protect the interest of the Depositors. Yet the depositors run the risk on these Banks and their ultimate borrowers of these banks as the depositors are not privy to the information for the end use of their money. In many countries the depositors are unsecured creditors of these Banks and Financial Institutions. This structure creates centralization of the risk management. Any failure in the risk management measures of the centralized system exposes the whole economy and the depositor or investor to greater risk. Though there are rules and regulations to govern the interest of the Depositor but as they don't have control over the end user of their monies. Even the depositors' insurance is limited to a certain fixed amount per depositor by insurance companies.

The Banks earn a spread over the interest paid to the depositor to cover the following:

1. Reserves maintained with the Central bank which yields less than market rate or no return.
2. Priority sector lending at a subsidized rate as prescribed by the Central bank, which yields a lesser rate of return.
3. Operational costs of running the banks.
4. Premium for the risk.
5. Profit for the bank.
6. Other borrowing risks.

SUMMARY OF THE PRESENT INVENTION

One embodiment of the present invention provides a lending and borrowing function involving a specific method for matching prospective borrowers with prospective lenders to initiate and complete a loan process. The method accepts data from the borrower (borrower data) via a computer network from one or more prospective borrowers. The borrower data includes, value of the loan, the loan term, rate of interest, the type of collateral to be used in the loan, the loan terms and their respective range of acceptable values, and what loan terms are negotiable by each prospective borrower. The method also accepts data from a lender (lender data) via a computer network from one or more prospective lenders. The lender data includes, the type of collateral to be used in the loan, the loan terms and their respective range of acceptable values, and what loan terms are negotiable by the prospective lenders.

After having received the borrower and lender data, the method involves comparing the lender data to the borrower data to determine where and if a data match occurs. The lender data matches the borrower data where the lender data has the same value as said lender data or is within the range of acceptable value of the lender data loan terms. The matching function works to identify a prospective borrower for the prospective lender. The method also matches borrower data to the lender data that has the same value as the borrower data, or is within the range of acceptable value of the borrower data loan terms. Here the matching function works to identify a prospective lender for the prospective borrower. The method also stores the borrower and lender data received.

Included with the method is the step of transmitting counterpart loan data to each method user whose respective data results in a user counterpart match. The method can also suspend the matching analysis of the loan data pertaining to a user upon request by the user.

The method facilitates multiple simultaneous communication between each prospective borrower with one or more of the prospective lenders whose lender data matches with the borrower data of the prospective borrower. The method further facilitates the prospective borrower to negotiate the terms of the borrowing with multiple lenders simultaneously. The method facilitates the borrower to finalize the deal with one or more lender. Likewise, the method facilitates multiple simultaneous negotiation between each prospective lender with one or more of the prospective borrower whose borrowing data matches with the lender data of the prospective lender. The method further facilitates the prospective lender to negotiate the terms of the lending with multiple borrowers simultaneously. The method facilitates the lender to finalize the deal with one or more borrower. The communication includes loan application negotiation, and completion of the loan application process.

After completion of the loan negotiation process, the method also comprises the step of transferring loan funds from the prospective lender to the prospective borrower through the escrow account of the method. The method also evaluates the collateral and accepts collateral in the form of pledge, lien, or mortgage from the prospective borrower through the escrow account managed by the method. The method can escrow the collateral and return the loan collateral to the prospective borrower upon return of the loan along with the accruals at the expiration of the loan. Alternatively, the method envisions forwarding the collateral to the prospective lender in the event of a loan default.

The method monitors the collateral value for the duration of the loan at periodic intervals, if the collateral value decreases below a specified amount, the method includes informing both counterparts and also requesting the borrower to add to the collateral account so that it is at or above the collateral specified amount. Further, the method will initiate action to liquidate the collateral and pay proceeds to the lender if the borrower does not replenish funds to the collateral account after being requested to do so.

Also during the life of the loan, the method is capable of receiving interest payments from the borrower and transferring the payment amount, or something equal in value, to the lender.

Should a foreclosure be required, the method is capable of foreclosing on the loan upon the request of one or more counterparts, and matching the remaining counterpart to a new counterpart to the loan. The counterpart requesting the foreclosure pays the penalty and charges of the other counterpart switching over to a new counterpart on new lending or borrowing terms.

The method tracks the performance of every member on various parameters including: fulfillment of the contractual obligation like return of the items lent or borrowed, amount of collateral, and rollover of the loan with increase or decrease in loan.

The Electronic Lending System will provide the following advantages:
1. Managing of risk is distributed among the whole economy
2. The traditional banking industry will gain by transaction processing without any involvement of credit risk.
3. The Borrower gets a return to the extent of the risk appetite by choosing the type of collateral.
4. The Lender gets a better rate for the type of collateral offered.
5. Reduces the cost of operations.
6. The traditional banking industry can participate in this process the following way:
   6.1. The borrower to pledge the shares, debts, or units to bank.
   6.2. The banks to issue bank guarantee.
   6.3. The borrower to give the bank guarantees to the lender as collateral for the loan.

Various other additional advantages and features of novelty, which characterize the invention, are further pointed out in the claims that follow. However, for a better understanding of the invention and its advantages, reference should be made to the accompanying drawings and descriptive matter which illustrate and describe preferred embodiments of the invention.

DETAILED DESCRIPTION

The Lending and Borrowing Forum according to the present invention will now be described with reference to the accompanying drawings.

Figure 1:
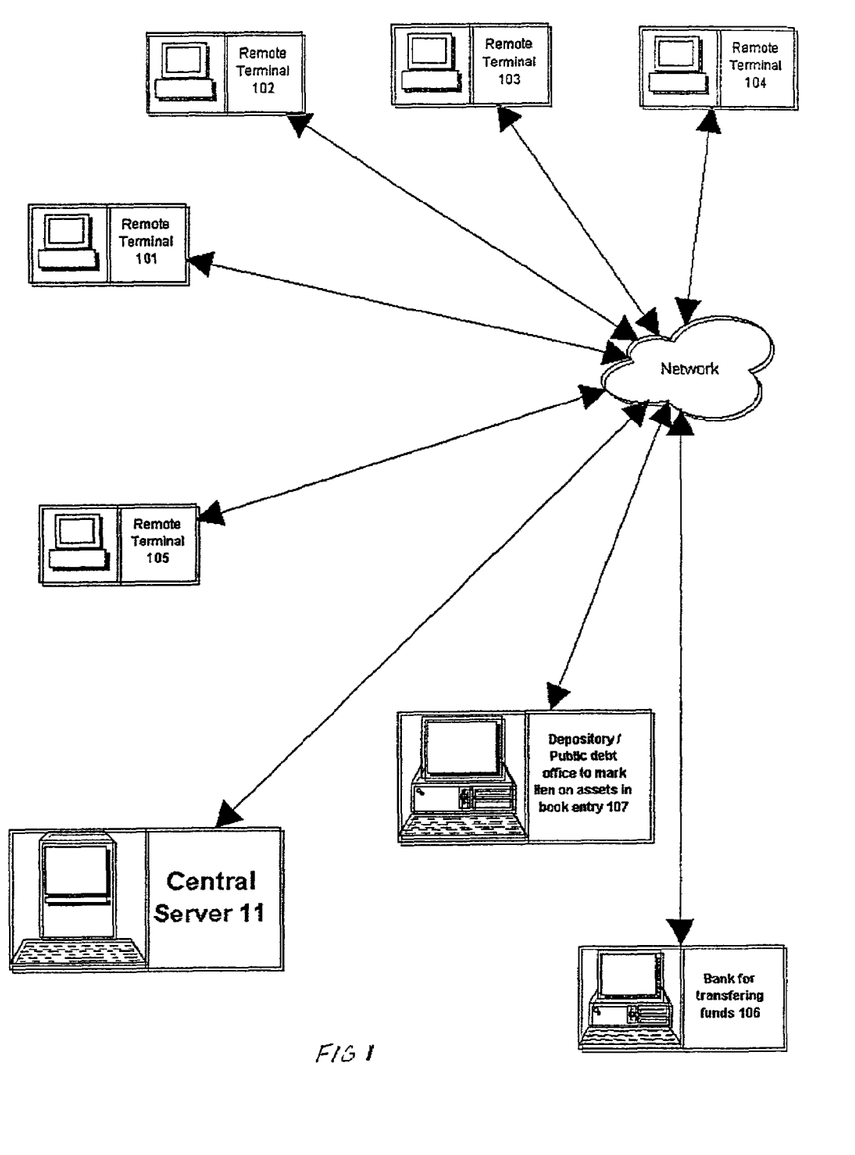
FIG. 1 provides a diagram of one configuration of the Lending and Borrowing Forum according to the present invention.

With reference to FIG. 1, one possible configuration of the Lending and Borrowing Forum 100 (the system) according to the present invention includes a central server computer 11 (central server), remote devices 101 and 102, and remote servers 106 and 107. The system contemplates a plurality of remote devices whereby a large number of users have simultaneous access to the system; however, for description purposes, two remote devices 101 and 102 and optional remote devices 103 and 104 are shown in FIG. 1. The users typically comprise potential borrowers and potential lenders, who are accessing the forum in search of a matched borrower or lender according to specific loan requests provided to the forum by each user. For clarity, a counterpart refers to the entity that is on the other side of the loan, for example, the counterpart to a lender would be the borrower, and vice-versa.

The system also includes a plurality of remote servers where by a large number of banks and depositories are connected to the system. The lenders access the bank remote server 106 for a transfer of funds to the methods escrow bank account, similarly, the borrowers access the depositories remote server 107 for the marking of pledge, liens, or mortgages, of the method on account for the lender.

While it is preferred that the central server 11 be the central processing unit of a computer, it will be obvious to those skilled in the art that a device or system like the one described herein having a central server 11 that is capable of receiving data via a network, and processing that data, will be included in the scope of this invention. The preferred remote devices (101-104) are personal computers or specifically produced input output stations capable of communicating with a central server via a network. However, any device that allows a user to communicate and receive data remote from the central server 11 can be considered as an obvious remote device with respect to the present invention. The system as referred to and described herein comprises the central server 11 as connected to the remote devices (101-104) via a communications network 1. The system also describes peripheral hardware such as data processors and data storage devices, as are well known in the art. Further, the system encompasses software that is used to manipulate the central server.

The central server 11 is connected to the remote devices 101 and 102 through a communication network 1. The communication network could be a public domain network of interconnected servers, such as the Internet, a local area network, a wide area network, or a private network using different type of devices capable of interacting with the central server 11. Communication between the remote devices (101-104) and the central server 11 is not limited to current networking means, but can include future wireless mediums of any frequency in the electromagnetic spectrum, such as, infrared, light, or ultra-violet light.

The communication between the between the user devices and the central server 11 involves primarily data transfer, either digital data or otherwise, concerning specific parameters of the prospective loan. As is well known in the art, the data can be keyed into the remote device by the user in data fields that appear on the remote device's display screen. The data fields are generated by software that resides on the central server 11 and are transmitted to the remote device via the employed network. However, any apparatus that enables the user to provide prospective loan information in a recognizable format to the central server 11 can be utilized in this invention.

Figure 2:
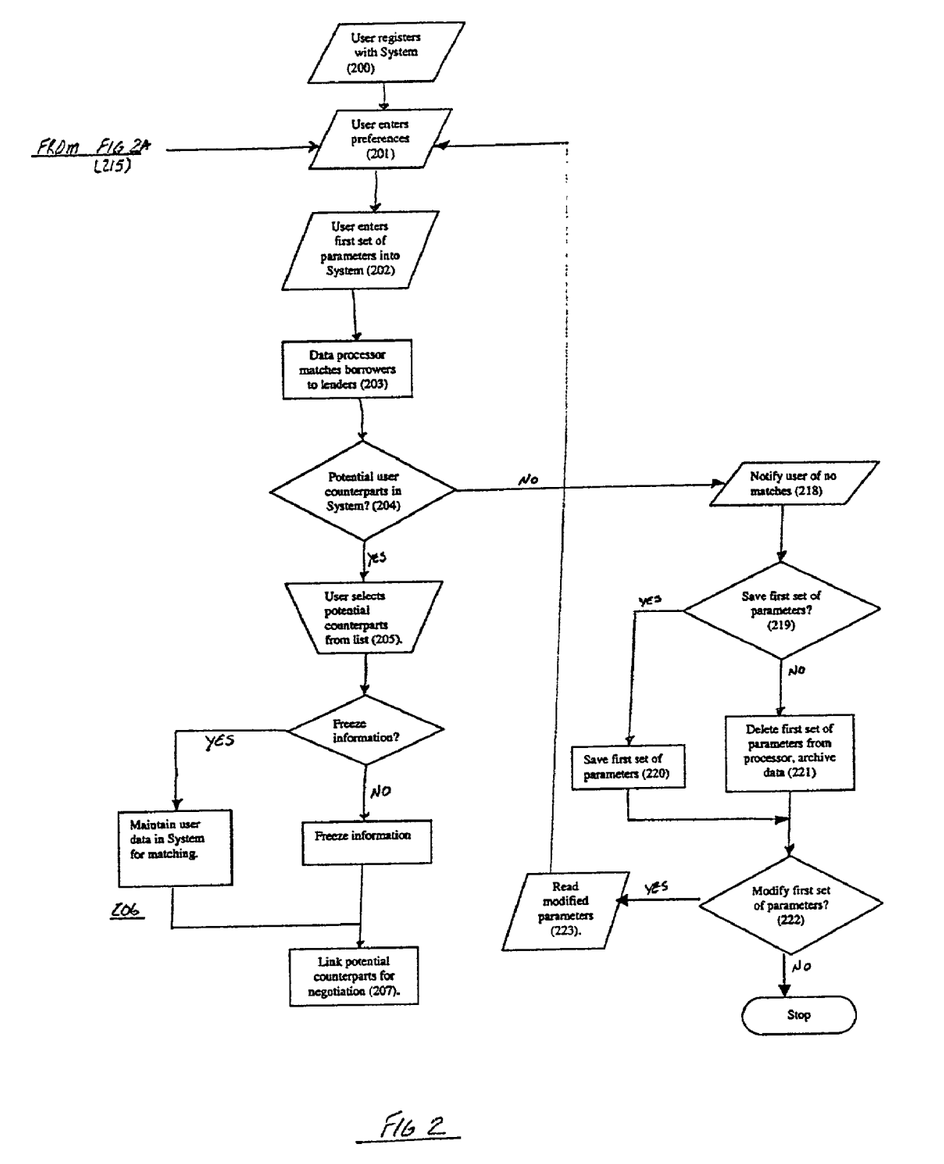
FIG. 2-8 provide a flowchart of the operation of the Lending and Borrowing Forum according to the present invention.
Figure 2A:
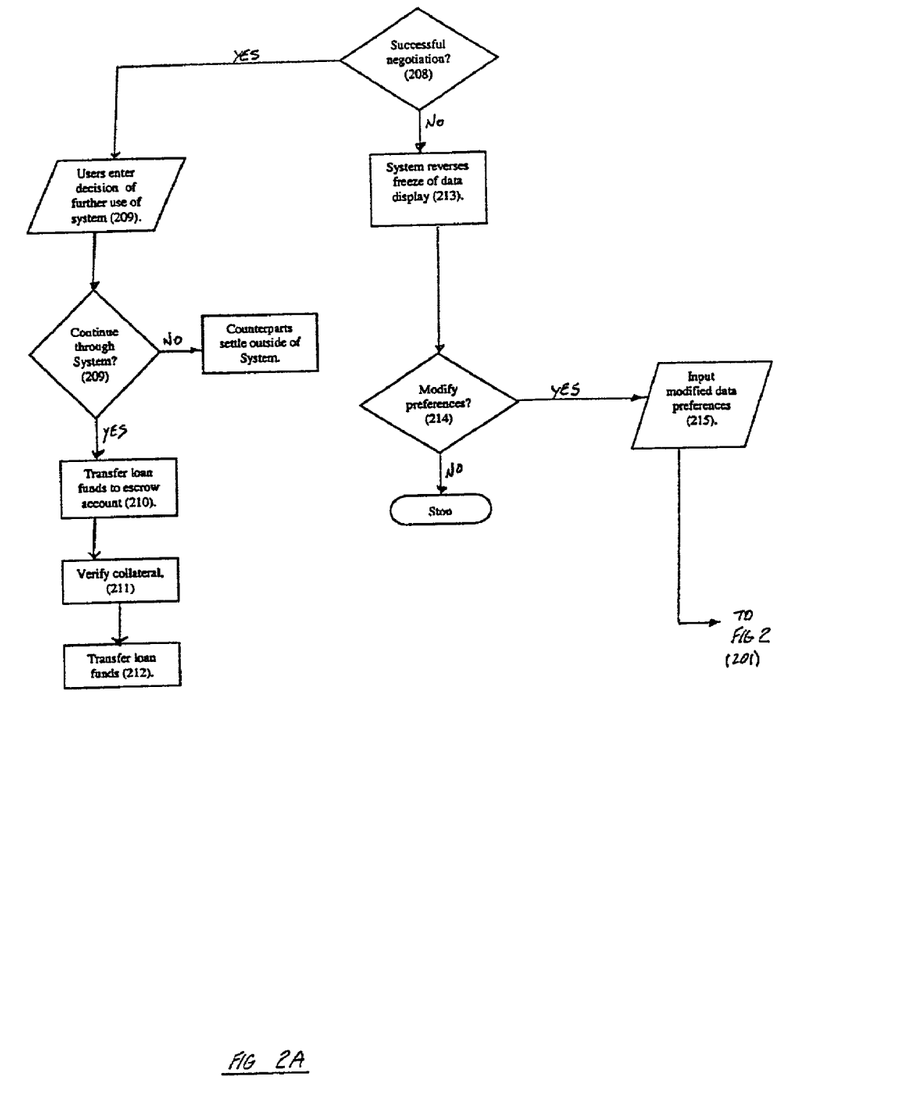
Figure 3:
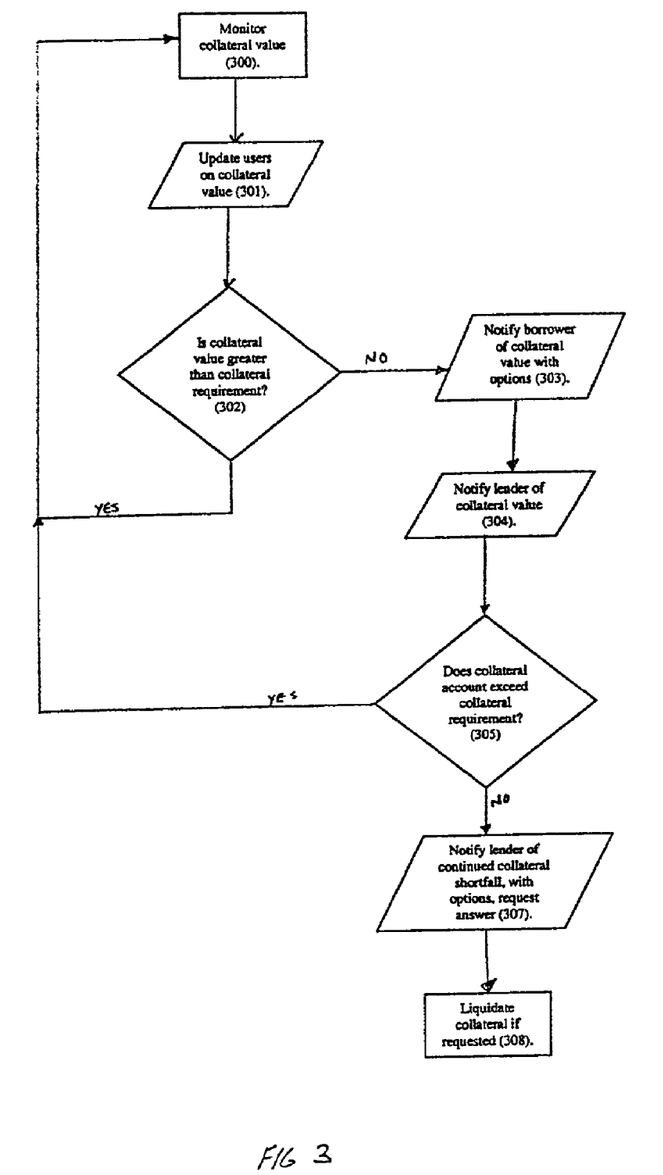
Figure 4:
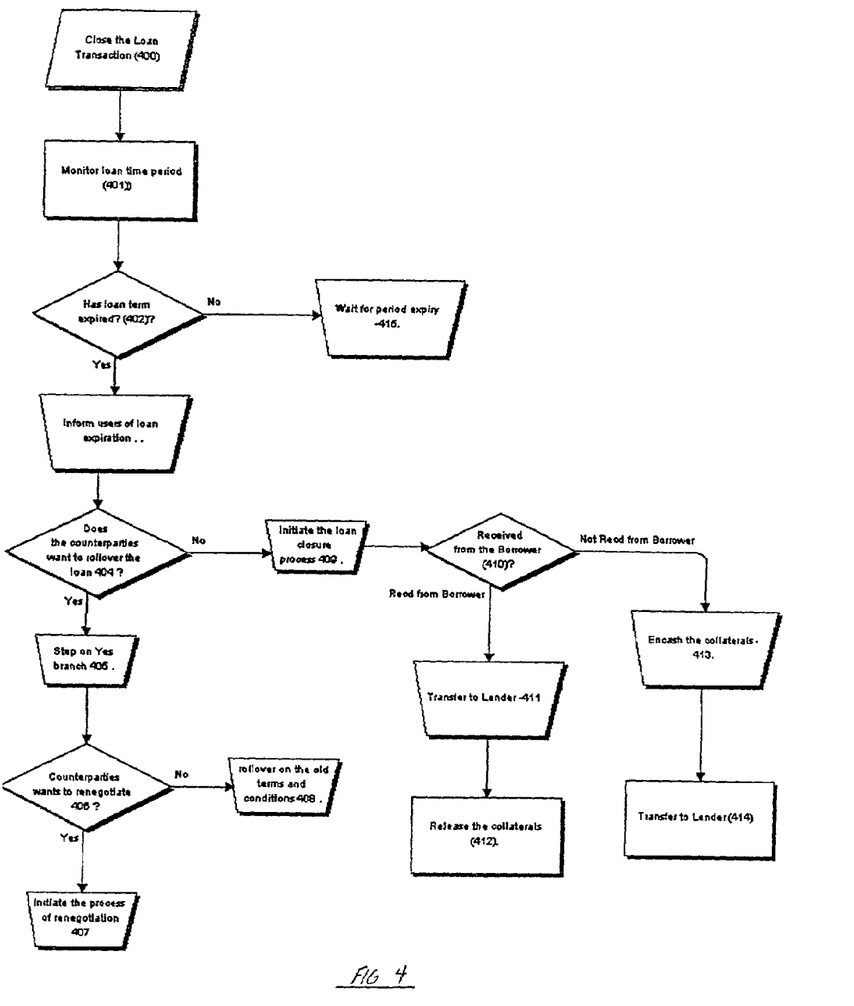

FIGS. 2, 3 and 4 provide the flow charts, which illustrate the overall operation of the Lending and Borrowing Forum according to the present invention shown in FIG. 1. The functions of the central server 11 as described below may be performed using a configuration of hardware components, software components, or both. The system is capable of processing transactions involving many types of instruments or tender, e.g., lending and borrowing of money, exchange of securities of various types, and bank guarantees.

Additionally, the system is capable of handling multiple types of loan scenarios such as consumer loans for the purchase of a home, vehicle, or other item where the consumer requires a loan for the purchase. The system also is capable of transacting loans for real estate, and commercial loans. Different types of loans are envisioned as well, that is traditional loans where the borrower makes monthly payments consisting of principal, interest, and other fees such as insurance, alternatively the payments could be bimonthly, quarterly, semi-annually, annually, or at the termination of the loan. Also, the payments could consist of interest only with a balloon payment of principal at the expiration of the loan.

For purposes of illustration, the operation of the system in a single market will be described below. The steps of operation are as follows.

PROCESS DESCRIPTION

200—The users register with the system using their respective remote devices. Every user is generally either a potential borrower or a lending institution. The registration process includes the user providing information such as contact information (phone number, street address, electronic mail address) and bank account details. Also upon registration, the user can provide evidence for future secure use, such as username, password, and a digital signature. The user information is stored by the system. Because the server is to be active at all times, users can register at any time. The method can also verify with the bank or the public debt office where the member possesses the account(s) and reports in their application and then allows the member to transact business.

201—After registering, the user can enter preferences with respect to maximum and minimum collateral required or available as well as the type of collateral required or available. The type of collateral under consideration could be capital, securities, a bank guarantee, real property, or personal property. If securities are chosen as collateral, the option is available to choose what industry sector the securities involve, as well as the type of securities (i.e. preferred shares). In addition to the amount of collateral required or available, the collateral margin can be specified as well. Upon registration, the system provides the user necessary documentation that is required by the laws of the specific jurisdiction where the user is located.

202—After submitting information regarding loan collateral, the user, either immediately or some time later, can enter the user's lending offer or the borrowing request. This is referred to as the first set of parameters. One of the many advantages of this invention is the flexibility the user enjoys in prescribing the first set of parameters. For example, not only can the user define the details of the first set of parameters, but can also indicate which, if any, of the parameters are negotiable, and which are not.

The first set of parameters can include the lending period (the length of the loan), the interest rate, loan amount, what is being loaned, what constitutes loan default, the minimum or maximum number of counterparts, payment terms, and default penalties. Whether the user is a potential borrower or lender, the user can also specify the range in which the first set of parameters could vary—that is if the user is a potential borrower, and inputs an interest rate of 8% with a 0.5% variance, the potential borrower is indicating he might accept a loan of 7.5% to 8.5%. The system can accommodate loans of capital, equities, or even debt. The capital must be defined by the currency being used, such as dollars, pounds, eurodollars, or whatever currency is to be loaned. The equities can be common shares of stock from public or private companies, or preferred shares, this is another option available to prospective lenders and borrowers. The payment terms include when the loan payments are due, i.e. monthly, bimonthly, quarterly, etc, the grace period for late payment, and the amount of each payment.

Information making up the first set of parameters is received by the central server 11 from the respective remote devices. This information is preferably stored by the central server 11 into a database located on a storage means such as magnetic storage media in digital form. However, the storage means is not limited to magnetic media, but can include currently known or storage means obvious to one skilled in the art. Similarly, the data can be stored outside of a database and in a form other than digital.

203—Connected to or integral with the central server 11, is a data processor that compares each loan offer with each borrower request (or vice-versa) in order to obtain a match. While the preferred data processor function is performed by the central processing unit of a computer as directed by computer software, any device or method capable of comparing multiple sets of data is covered by this invention. A match between a loan offer and a borrower request occurs if each of the first set of parameters of the loan offer are equal to, or fall within the given range, of the first set of parameters of the respective borrower request. This is termed a user counterpart match, since the counterpart to a prospective lender is a prospective borrower and vice-versa. Further, the loan data entered by the matched borrower and lender, is referred to as counterpart loan data.

The matching criteria of the present invention is that the non-negotiable values of the first set of parameters contained in the counterpart offer (either a borrower request or loan offer) be equal to, or within the variable range, the non-negotiable values of the first set of parameters in the borrower request or loan offer to which the counterpart offer is being compared to.

One of the many advantages of this invention is that the users have the option of choosing from a number of alternative forms of matching the lender data to the borrower data. For example, alternative matching functions can include an auction and reverse auction model, a negotiation model, a catalogue aggregation model, and a buyer aggregation model.

The auction and reverse auction model involves the user engaging multiple loan counterparts simultaneously, where the counterparts bid on the loan offer or the borrower request. Here the term counterpart refers to the party on the other side of the loan transaction. That is, the counterpart for the user who is making the loan offer would be a user making the borrower request. An example of the auction and reverse auction model in action would be if a user submitted a borrower request which specified auction matching, then multiple users offering loans would submit their loans to the prospective borrower in an attempt to outbid each other. The bidding process would then take on an upward dynamic pricing action. Similarly, a user offering a loan on the subject system could specify the auction matching, and multiple prospective borrowers could engage in the bidding process. This process can occur real time, that is with all users being in communication with the central server at the same time, or can occur over a more protracted period of time, where the bidders are in communication with the central server at separate times.

In the negotiation model, the counterparts indicate that all terms are negotiable and negotiate the terms via the system. Similar to the negotiation model is the catalogue aggregation model where some of the prospective lenders or borrowers could post a willingness to lend or borrow, where the postings are valid for a long duration. The advantage of this is that it enables the specific user the ability to evaluate multiple loan offers or borrower requests before entering into the negotiation phase.

Opposite to the catalog aggregation model is the buyer aggregation model where groups of like users (users who are all prospective lenders or are all prospective borrowers) come together to form a virtual large lender or borrower. This volume aggregation could enable the aggregate group to obtain a volume discount based on the size of the group.

204—When a match between a specific loan offer and borrower request occurs, the central server 11 will internally store the match data in electronic or magnetic form. The system and transmit the matched loan offer to the matched borrower's device for viewing and analysis. Likewise, the central server 11 will transmit the matched borrower request to the specific matched lender's remote device for viewing and analysis. The loan offer and borrower request data is configured so that the respective displays are bifurcated into a first section that displays the non-negotiable parameters, and a second section that displays the negotiable parameters.

205—Having received the matched counterpart's data, which can comprise more than one offer or request, and having had a chance to review that data, the user can select from the list of matched offers or requests. The selection process entails the user utilizing his or her remote device (101-104), either by a keyboard, or some peripheral accessory, such as a mouse. While this is the current preferred method of selecting from the potential list of offers or requests, all methods obvious to one skilled in the art are considered a part of this invention.

The method also allows a potential borrower to select from the initial match list of lenders, and to interact with some or all of the lenders in order to negotiate the terms of the loan. The users also have the option of gathering past loan history of the potential counterpart, such as the potential borrowers credit history.

Each prospective borrower or lender that is selected by the user is notified of the selection by the system. The system can be modified to perform the selection process by one skilled in the art without undue experimentation. The selected counterpart receiving notification of selection has the option of responding via the system to the user to confirm the selection or opting out at that time.

206—Once the borrower and the lender confirm the selection, either counterpart has the option of freezing the selection information so that it is not displayed to other users.

207—After selection, and if desired, the counterparts can negotiate further to arrive at final loan terms. The central server 11 provides an option for a direct communication link between the counterparts through the system, such as a chat session. Also provided via the central server 11 is the communication option of messaging, such as real time electronic messaging, or electronic mail.

One of the many advantages of the negotiating aspect of the invention is that potential counterparts have the option to provide loan offers or borrower requests that indicate a match may be possible if some aspects of the offer or request were negotiable. Thus, if given the opportunity to negotiate some aspects of the offer or request, a particular user can ultimately locate (by virtue of a system match) more potential counterparts than if no opportunity to negotiate were given. Increasing the number of potential counterparts optimizes the loan matching function for every user.

208—Once all of the parameters, negotiable and non-negotiable, are agreeable to both counterparts, a confirmation is communicated to each counterpart through the central server 11.

209—After the confirmation is transmitted by the central server 11, the system flags the particular lending and borrowing negotiation as concluded. At this point the counterparts have two options, they can settle the lending and borrowing transactions through the assistance of the system, or move offline and settle outside the system.

210—If the counterparts opt for the settlement of the lending and borrowing transaction through the forum, the lender transfers the loan amount from the lender into a system managed escrow account for future access by the borrower. Although for illustration the transfer of capital has been described, if securities are being lent, securities would be transferred to the common account of the system preferably in a fashion that is customary in the industry.

211—The collateral is then received by the system from the borrower, and the method evaluates that the collateral is in the amount and type as purported by the prospective borrower. If the collateral is in the form of a pledge on securities or bank guarantees, it could be verified with the depositories, banks, public debt offices or the concern authorities.

212—Once the collateral as agreed between the lender and the borrower has been evaluated and its existence and amount verified, the lending capital is transferred from the escrow account that is managed by the system to the borrower.

213—Should the negotiation by the potential counterparts be unsuccessful, then on receipt of this information, the central server 11 would release the freeze as described in step 206.

214—If the negotiation by the potential counterparts is unsuccessful the users have a choice to re-enter the terms and/or modify the preferences for possible future matching within the system to other potential counterparts.

215—Modify the preferences and follow the steps from 200.

218—If the system is unable to locate a match for the user, either real time or in the time specified by the user, the system will notify the user that no match was found meeting his or her stated parameters.

219—Cognizant that no matches were available, the user nevertheless has a choice to save his or her previously input first set of parameters for future matching.

220—If the user chooses to save the first set of parameters with the system, the central server saves that data for future matching based on subsequently entered first set of parameter data input by prospective borrowers or lenders.

221—If the user chooses not to save the data, the data is stored by the central server 11 for archiving purposes and for market analysis, but not for matching.

222-223 are similar to steps 213-215.

300—In order to reduce the risk of defaults, the central server monitors the value of the collateral provided by the borrower. If the borrower has pledged shares or securities, the system would monitor the value of these shares by interfacing with market price data. FIG. 3 describes this process. In case of other type of collateral those will be valued on their market value (or face value if the market value is not available) or as instructed by the lender.

301—Here the system provides updates regarding the collateral value to the user counterparts.

302—After monitoring the real time collateral value, the system compares that value against the collateral value requirements as previously dictated by the lender and agreed to by the borrower.

303—If the collateral value is determined to be lower than the collateral value requirement, the central server 11, depending on the fall in real time collateral value and the preferences of the lender: (1) informs the borrower about the drop with a request that the borrower provide additional collateral; (2) warns the borrower that if there is no response within a specified time frame, the already submitted collateral would be liquidated to the lender; or (3) liquidates the collateral and forward the proceeds plus interest to the lender and the excess to the borrower.

304—As determined in 302, the lender is also notified about the fall in collateral value.

305—As specified in 303, the borrower is requested to recapitalize the collateral value until the collateral value equals the collateral requirements.

307—If the borrower fails to recapitalize the collateral shortfall, the lender is so notified, and asked if the previously submitted collateral is to be liquidated.

308—If the Lender confirms liquidation in 307, the system would liquidate the collateral assets. The liquidation could be automatic through an electronic broker connected to a securities exchange, or could be manually performed by traditional forms of asset liquidation. The capital return from the asset liquidation is provided to the lender, liquidated assets that exceed the collateral margin shortfall are transferred to the borrower.

400—Once the agreed lending period has expired, the central server facilitates the return of the items lent to the lender and the return of the collateral to the borrower. The system also enables the users the option of requesting that they be informed of the pending asset transfers a prescribed amount of time prior to the expiration of the contract.

401—The time periods of all loans in the system are monitored on a daily basis by the system. The central server 11 can perform this function, or so can ancillary hardware and software components as is well known in the art.

402—The central server 11 determines if the lending period is close to expiration.

403—The users are informed prior to the expiration of the lending period as defined in the parameters.

404—Here the system asks the users if they wish to engage in a subsequent loan transaction (rollover). If the users wish to engage in a rollover transaction, the system provides the option of a rollover on the same terms as the initial loan transaction, or alternatively the users can develop new loan terms.

406—Here the counterparts inform the system of their intent to negotiate the loan.

407—The method provides opportunity for the counterparts to re-negotiate some or all of the loan. As noted above, the users can choose to communicate directly with each other offline outside of the system, or the users can choose to provide queries and responses through the system via remote devices and the system receives and transmits the queries and responses to the respective counterparts. It will be appreciated that one skilled in the art can readily create a system capable of performing the above noted tasks without undue experimentation.

408—Here the system performs the loan rollover on the existing terms, with any interest accrual being added to the loan capital amount.

409—If the counterparts do not desire to engage in a loan rollover, the system will initiate the loan closure process.

410—The system receives from the borrower the loaned capital including accrued interest. If what is being lent is shares, the borrower shall return any accruals of corporate action, like bonuses or dividends, which occurred during the lending period. The transfer from the borrower to the system can be by negotiable instrument, electronic transfer, or any other method representing a transfer of funds. Modifications obvious to one skilled in the art are considered a part of this invention.

411—Once the funds are received from the borrower the system transfers them to the lender.

412—After funds equaling the loan amount are received by the system from the borrower, the system returns the collateral to the borrower.

413—If the borrower fails to provide loan payments, the collateral can be liquidated at the request of the lender.

414—Proceeds from the liquidated collateral are transferred to the lender.

Figure 5:
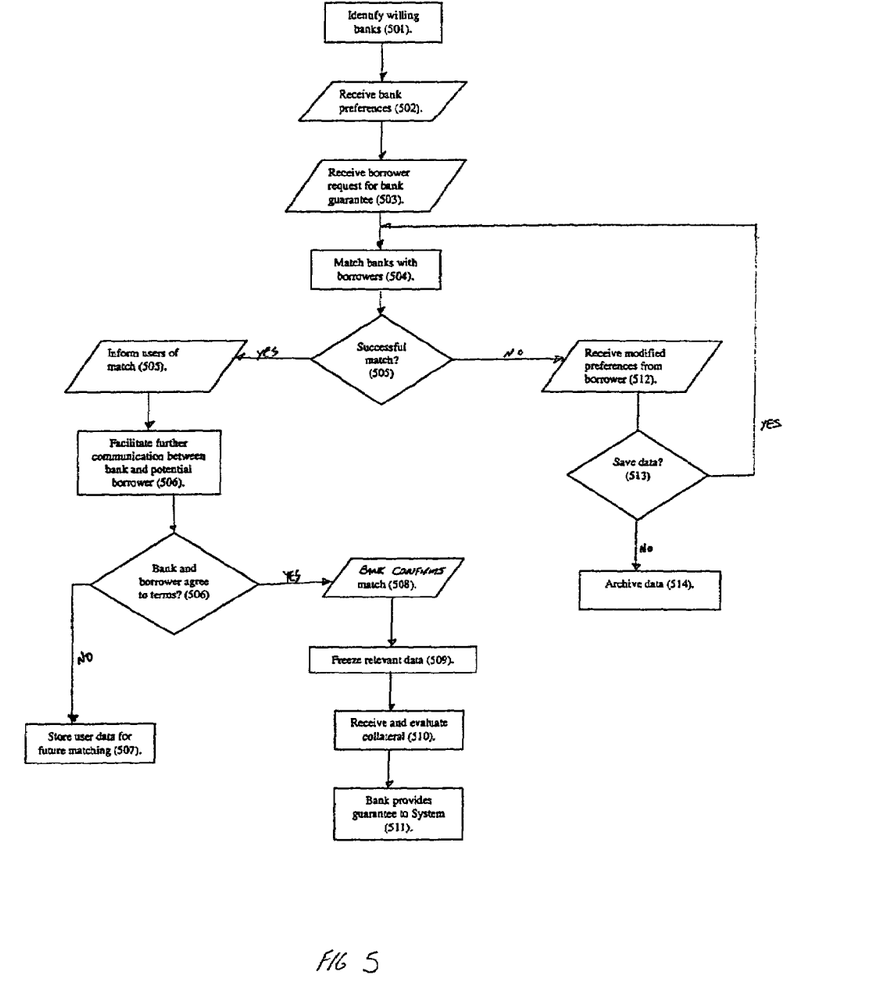

Steps 501 through 514 describe how a potential borrower can obtain a bank guarantee from a bank utilizing the system disclosed herein. In obtaining a bank guarantee it is envisioned that the potential borrower will offer collateral in exchange for the guarantee. The collateral can include: (1) securities including shares; (2) debt instruments; or (3) a bank guarantee. If a borrower can first obtain a bank guarantee, the borrower can possibly obtain a lower interest rate from a lending institution.

501—The system assists borrowers to obtain bank guarantees by identifying banks that are willing to participate in the system by providing bank guarantees.

502—Each bank, by communicating with the central server 11, would provide preferences with respect to the maximum and minimum collateral required (with respective margins), charges, and the type of collateral required to issue a bank guarantee. For example, the type of collateral could be shares or debt instruments. In case shares or debt instruments are chosen as collateral, a preferred industry segment of the shares is also an option available for the bank to consider and choose.

503—Each prospective borrower then can login and can enter a request for a bank guarantee. The prospective borrower can specify the time period and the amount for which the bank guarantee is required as well as the type of the bank (Foreign, Nationalized, Scheduled, Cooperative Banks and others) from which the user requires the bank guarantee.

504—The central server 11 attempts to match the borrowers' requests with the Bank's preferences.

505—If the matching is successful, the central server 11 displays on the remote device the matched requests to the borrower and informs the Bank.

506—As between the counterpart users above described, the system provides for further communication, where the communication includes negotiation, between the Bank and the prospective borrower regarding specific terms of the bank guarantee.

507—If the negotiation fails, the data contained in the borrower request is maintained in the system for further matching.

508—On successful negotiation of all terms, the Bank confirms the match by transmitting a confirmation to the central server 11.

509—Once the Bank confirms the selection, the central server computer would freeze the information such that it is not displayed to the other Banks.

510—The collateral is received from the borrower and placed into an escrow account. Here the system evaluates that the collateral is in the amount and type as purported by the prospective borrower. The collateral could be in the form of a pledge, mortgage, or lien that could be verified with the depositories, banks, public debt offices, or the concern authorities.

511—Once the type and amount of the collateral as promised by the borrower has been verified and has been received by the system, the Bank would then provide the bank guarantee to the borrower and inform the system. The method would facilitate the borrower to offer this bank guarantee as a collateral for any loan transaction that occurs within the system described herein.

512—If there is no bank interested in providing bank guarantees, the prospective borrower can modify the preferences and follow the steps from 500.

513—If the prospective borrower chooses to save the data concerning the request for bank guarantee, the central server computer would save the details and would use it for future request.

514—If the user chooses not to save the data, the data is stored by the central server computer for archiving purposes and for market analysis but would not use it for matching.

Figure 6:
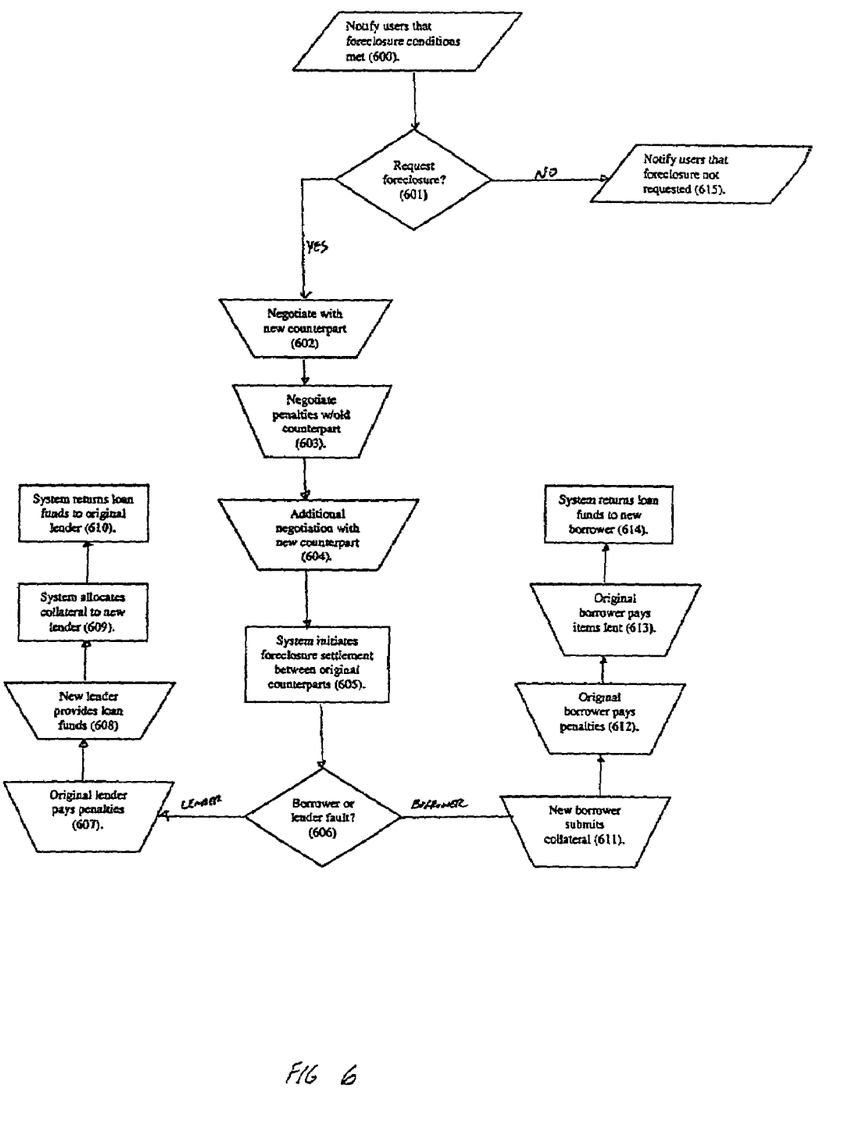

600. If the conditions precedent for a loan foreclosure have occurred, the system can provide notice of such events to both counterparts to the loan so that the counterparts can assess if a foreclosure is desired.

601 Either counterpart now has the option to place a request of foreclosure on the other counterpart. The request can be facilitated through the system.

602. After receiving confirmation from the counterpart, the party requesting foreclosure may negotiate loan terms with a new potential counterpart for the remaining period of the loan. Where the negotiable terms of the loan are the loan amount, the interest rate, and collateral.

603. Here the counterparts to the original loan agreement negotiate the penalties with regard to the foreclosure.

604 The party requesting foreclosure negotiates with the new counterpart for the remaining terms of the loan period, loan amount, interest rate, and other related loan terms.

605. Upon a successful negotiation between the new counterparts, the system is requested to initiate the foreclosure settlement between the original counterparts.

606. Here the central system determines if the foreclosure was the fault of the original borrower or original lender.

607. If the original lender was the cause of the foreclosure, the original lender to pay penalties to the original borrower.

608. The new lender provides funding to replace intended loan amount.

609. Once the new lender provides funding, the system will allocate the collateral in the name of the new lender.

610. After collateral allocation in the new lender's favor, the system will return the remainder of the original loan amount to the original lender.

611. If the new counterpart is a new borrower, here the new borrower submits collateral to the system.

612. The original borrower pays foreclosure penalties to the original lender.

613. Original borrower returns original loan item to the system

614. After receiving the loan proceeds from the original borrower, the system can transfer those proceeds to the new borrower.

615. If the original counterpart who is not requesting foreclosure does not want to foreclose the loan, that message is communicated by the system to the counterpart requesting foreclosure.

Figure 7:
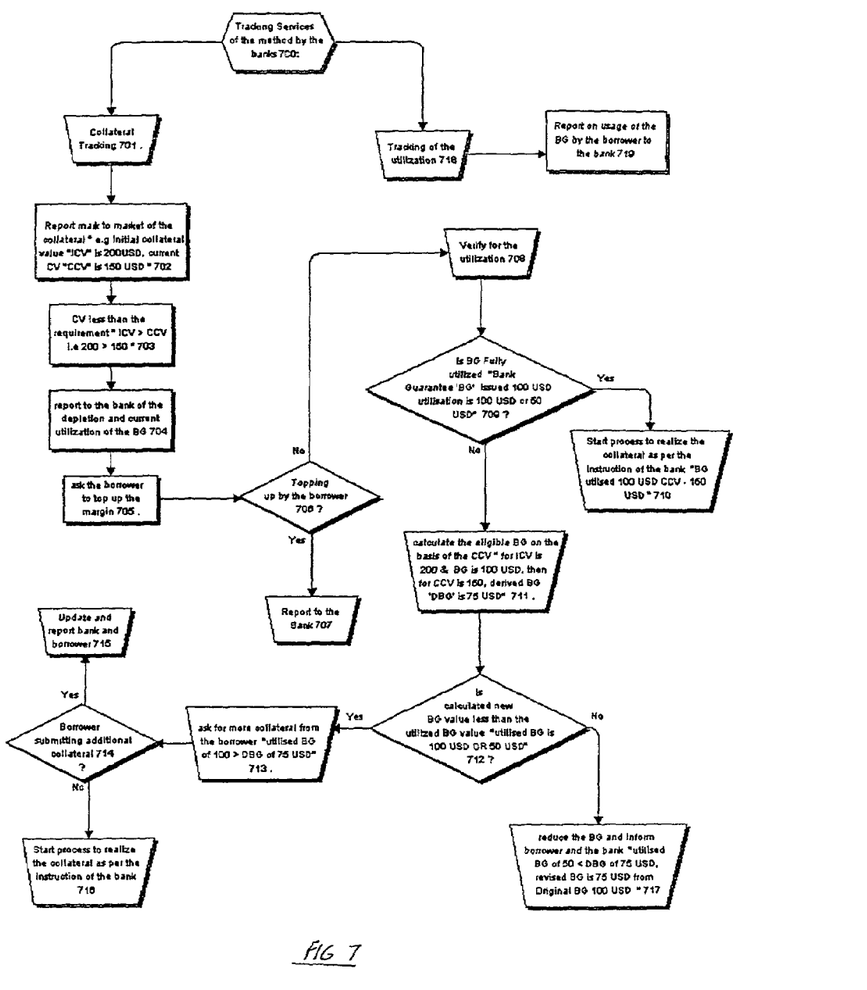

700. Here the method provides a tracking service to member banks that have issued guarantees for the members on the basis of collateral.

701. The value of the collateral submitted by the borrower to the bank in consideration of a bank guarantee can be tracked by the system.

702. Here, "the mark to market" value of the collateral is determined. The "mark to market" is calculated by determining the current market value of the collateral versus the amount of the bank guarantee that has been utilized by the borrower for loans.

703. The system compares the collateral value as indicated in the market report with the required collateral amount to determine if the current collateral value is less than the required collateral amount. Here the required collateral amount is the amount of the bank guarantee.

704. The system notifies the borrower and the bank if a collateral shortfall (i.e. the current collateral value is less than the required value) is present. The system also reports to the lender how much of the bank guarantee has been "utilized", the bank guarantee is utilized when it is used as collateral for a subsequent loan by the borrower. The amount utilized is generally some percentage of the amount of the bank guarantee, it is typically not equal to 100% of the bank guarantee due to lending costs associated with obtaining a loan.

705. The system requests that the borrower add to the collateral amount to overcome the collateral shortfall.

706. The system monitors the collateral value to determine if the borrower has provided additional funding to the collateral account such that the collateral shortfall is eliminated.

707. When additional funding is added to the collateral account, the system notifies the bank and the borrower accordingly.

708. If no funds are added to the collateral account, the system calculates how much of the bank guarantee has been utilized by the borrower in procuring subsequent loans within the system.

709. The system determines if the bank guarantee has been fully utilized, that is if the borrower has procured a loan against the entire amount of the bank guarantee.

710. If the bank guarantee has been fully utilized, then the system liquidates the collateral upon instruction by the bank.

711. If the bank guarantee has not been fully utilized, but instead utilized to some amount, the system then calculates the amount of the bank guarantee that can be utilized (the eligible bank guarantee). The amount of the bank guarantee that can be utilized will be a portion of the current collateral value minus the amount of the bank guarantee that has already been utilized.

712. The system determines if the eligible bank guarantee is greater or less than the amount of the bank guarantee that has been utilized.

713. The system informs the borrower that he needs to submit additional collateral.

714. The system monitors the collateral account to determine if additional collateral has been added or not.

715. If the borrower submits the collateral as required, the system updates its records and informs the bank and borrower as to the collateral account status.

716. If the borrower fails to submit additional funds to the collateral account, the system begins to liquidate the collateral.

717. If the eligible bank guarantee value is less than the utilized bank guarantee, the system recalculates the eligible bank guarantee based on the utilized bank guarantee and the collateral value. After recalculating the new eligible bank guarantee amount, the system informs the borrower and the bank of the new value.

718. The system tracks how the borrower has utilized the bank guarantee with lenders within the system.

719. The system provides periodic reports to the bank and the borrower of how the borrower has utilized the bank guarantee with lenders within the system.

Figure 8:
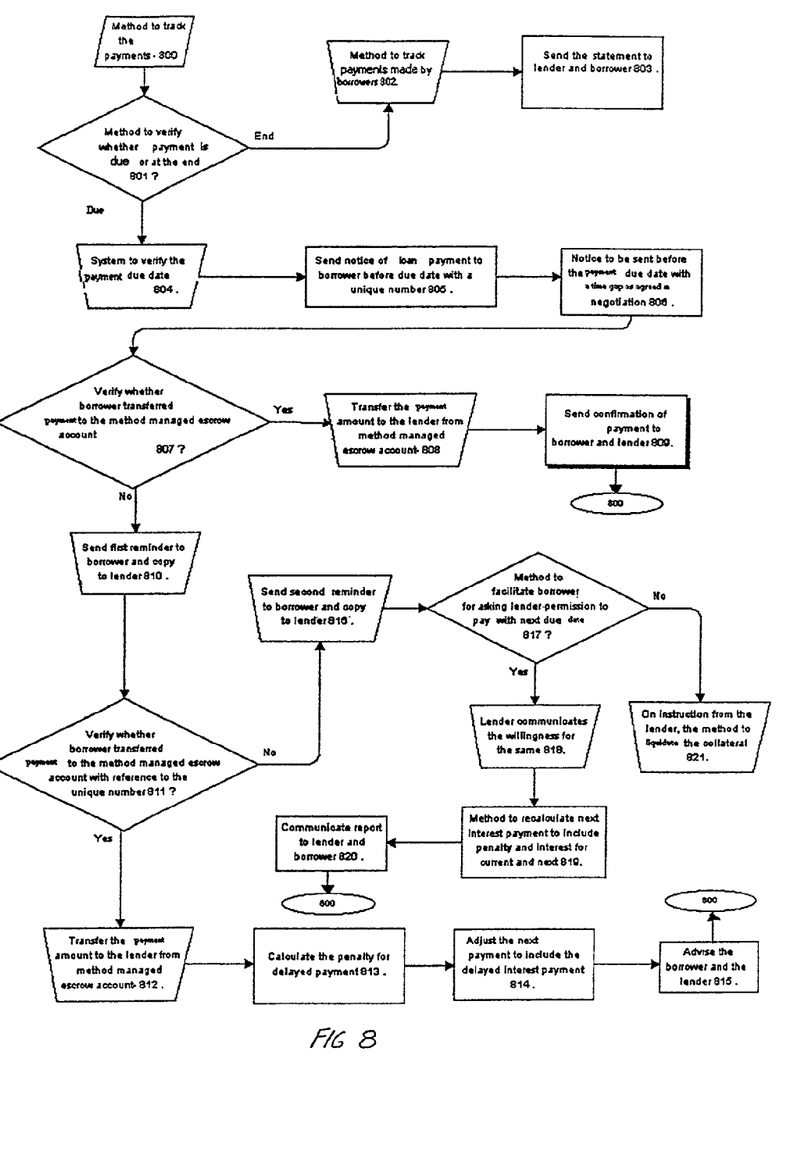

800. As noted above, the system provides a method for receiving loan payments from the borrower and forwarding those payments to the lender. In addition to receiving and forwarding these payments, the system will monitor all payments made, if the payments are made timely, how much interest and principal has been paid. The system can also notify the users if payments have not been made timely and take steps to correct a non-payment. These steps are described in more detail below.

801. The system monitors if a loan payment is due, or if all required loan payments have been made to the system by the borrower. As described below it is considered that the loan payment be an installment loan that is comprised of a conglomeration of interest, principal, and other fees such as insurance and possibly home owners' association fees. However, the loan payment can alternatively be a real estate or commercial loan. Further, the loan payment requirements might require just periodic interest payments with the balance of the loan payable in the form of a balloon payment at the termination of the loan.

802. If all loan payments have been made, the system calculates the total amount paid by the borrower, including how much principal, interest, insurance, and all other fees are due.

803. Here the system provides statements to the borrower and lender reflecting the payments made and how they were distributed, i.e. how much of the loan payment was allocated to pay for principal, interest, or other associated fees.

804. The system will determine the next loan payment due date.

805. Based on the current date, and the date of the next loan payment, the system will have a notice sent to the borrower that a loan payment is due. The notice should be sent with sufficient time to reach the borrower and give the borrower time to make payment on the loan. The amount of time provided before the payment is due, can be decided by the borrower and the lender under the payment terms.

807. If it is determined that a loan payment is due, the system will check the escrow account to determine if a loan payment has been made for the subject loan period.

808. If a loan payment has been timely made, the system will then transfer that loan payment from the escrow account to the lender.

809. After the system confirms that the loan payment has been made, the system will provide a confirmation of that payment to the borrower and lender.

810. If the system determines that a loan payment is due where no loan payment has been made, the system will send out a first notice to the borrower and to the lender indicating that a loan payment is due and has not been paid.

811. At some time after the first notice has been made, the system will query the escrow account to determine if the overdue loan payment has been made. The amount of time given between sending out the notice and querying the account is generally about 10 days, but can vary depending on the users and upon agreement between the lender and borrower.

812. If the payment in response to the notice is made to the escrow account, the system will then transfer that amount to the lender.

813. Upon transfer the system calculates the late payment penalty that is to be accrued to the borrower.

814. The next payment due is then adjusted to include the amount of penalty for late payment.

815. Statements reflecting the penalty amount and loan amount are prepared and forwarded to the lender and borrower.

816. If payment has not been made upon the second query, a second notice is sent to the borrower and to the lender indicating that the payment has not been made.

817. At some time period after sending the second query, the system will ask the lender if the collateral is to be liquidated, or if the borrower can delay the late payment until the next payment is due.

819. If the lender agrees to accept payment upon the next due date, the system will calculate the next payment amount which includes both payments and a late payment penalty with interest.

820. After calculating the new next payment amount, the system will forward the payment report to the lender and borrower.

821. If the lender wishes to liquidate, the system will initiate proceedings to liquidate the collateral and will forward the proceeds from the liquidation to the lender.

The present invention described herein, therefore, is well adapted to carry out the objects and attain the ends and advantages mentioned, as well as others inherent therein. While a presently preferred embodiment of the invention has been given for purposes of disclosure, numerous changes in the details of procedures for accomplishing the desired results. For example, remote devices could include devices such as personal digital assistants, pagers, and cellular phones, or any other device receiving or transmitting data via a wireless medium. These and other similar modifications will readily suggest themselves to those skilled in the art, and are intended to be encompassed within the spirit of the present invention disclosed herein and the scope of the appended claims.

The invention claimed is:

1. An apparatus for matching prospective borrowers with prospective lenders to initiate and complete a loan process in a consumer to consumer electronic borrowing and lending scheme, comprising:
   a means for accepting borrower data via a computer network from one or more prospective borrowers, where said borrower data includes, the type of collateral to be used in the loan, the loan terms and their respective range of acceptable values, and what loan terms are negotiable by each prospective borrower;
   a means for accepting lender data via a computer network from one or more prospective lenders, where said lender data includes, the type of collateral to be used in the loan, the loan terms and their respective range of acceptable values, and what loan terms are negotiable by said prospective lenders;
   a means for constant evaluation of said collateral;
   a means for comparing said lender data from each said prospective lender to said borrower data from each said prospective borrower;
   determining when said lender data from a prospective lender matches borrower data from a prospective borrower to identify a user counterpart match, where matching occurs when the values of said lender data equal the values of said borrower data or when said lender data or said borrower data is within the range of acceptable value; and
   a means for providing lender with a list of borrowers, who have data matching the lender's data;
   a means for providing borrower with a list of lenders, who have data matching the borrower's data;
   a means for lenders and borrowers to negotiate terms of loan and complete loan process where terms of loan comprises of loan amount, period, rate of interest, collateral, collateral amount, type of collateral, mix of collateral, number of calls to be made, calls for top up, foreclosure, foreclosure penalty, validity period, collateral availability, and mode of payment; and
   a means for lenders and borrowers to add new terms of loan for negotiation with counterparties,
   where both lenders and borrowers are consumers.

2. The apparatus of claim 1, further comprising a means for storing said borrower data.

3. The apparatus of claim 1, further comprising a means for storing said lender data.

4. The apparatus of claim 1, further comprising a means for facilitating communication between each said prospective borrower with one or more of said prospective lenders whose lender data matches with the borrower data of said prospective borrower, wherein said communication includes loan application negotiation, and completion of the loan application process.

5. The apparatus of claim 1, further comprising a means for facilitating communication between each said prospective lender with one or more of said prospective borrowers whose borrower data matches with the lender data of said prospective lender, wherein said communication includes loan application negotiation, and completion of the loan application process.

6. The apparatus of claim 1, further comprising a means for transferring loan funds from said prospective lender to said prospective borrower.

7. The apparatus of claim 1, further comprising a means for transferring said collateral from said prospective borrower to a user collateral account.

8. The apparatus of claim 1, further comprising a means for escrowing said collateral and returning said collateral to said prospective borrower upon expiration of the loan, and alternatively forwarding said collateral to said prospective lender in the event of a loan default.

9. The apparatus of claim 8, further comprising a means for constant evaluation of the value of said collateral.

10. The apparatus of claim 9, further comprising a means for informing said counterparts if said collateral value is less than said collateral value requirement.

11. The apparatus of claim 8, further comprising a means for receiving a collateral value requirement as agreed to by said lender and said borrower.

12. The apparatus of claim 11, further comprising a means for requesting said borrower to deposit funds to replenish the reduction in said collateral value below said collateral value requirement.

13. The apparatus of claim 1, further comprising a means for transmitting counterpart loan data to each user whose respective data results in a user counterpart match.

14. The apparatus of claim 1, further comprising a means for suspending the matching analysis of the loan data pertaining to a user upon request by the said user.

15. The apparatus of claim 1, further comprising a means for evaluating the availability and value of the collateral offered by said prospective borrower.

16. The apparatus of claim 1, further comprising a means for receiving loan payments from said borrower and transferring funds equal to said loan payments to said lender.

17. The apparatus of claim 1, further comprising a means for foreclosing on the loan upon the request from one or more counterparts.

18. The apparatus of claim 17, further comprising a means for matching the counterparts of the foreclosed loan with other counterparts.

19. The apparatus of claim 1 wherein said loan is selected from the group consisting of capital, equities, or debt.

20. The apparatus of claim 1, wherein said means for matching comprises a buyer aggregation model.

21. The apparatus of claim 1 further comprising a means for querying said matched borrower and said matched lender for a rollover loan on the same terms or on new terms.

22. The apparatus of claim 1 further comprising storing match data.

23. The apparatus of claim 1 further comprising a means for monitoring when loan proceeds are due, receiving said loan proceeds into an escrow account and transferring said loan proceeds to a lender.

24. A method for matching prospective borrowers with prospective lenders to initiate and complete a loan process in a consumer to consumer electronic borrowing and lending scheme conducted over a computer network comprising a central server connected to a plurality of remote devices through a communication network, at least one of the central server and the plurality of remote devices having a memory on which a program configured to execute the electronic borrowing and lending scheme can, at least in part, be stored, comprising the steps of:

accepting borrower data via the computer network from one or more prospective borrowers, where said borrower data includes, the type of collateral to be used in the loan, the loan terms and their respective range of acceptable values, and what loan terms are negotiable by each prospective borrower;

accepting lender data via the computer network from one or more prospective lenders, where said lender data includes, the type of collateral to be used in the loan, the loan terms and their respective range of acceptable values, and what loan terms are negotiable by said prospective lenders;

evaluating the value of said collateral at a specified time period and providing an alert if the collateral falls below a baseline value and requesting supplemental additions to the collateral;

comparing said lender data from each said prospective lender to said borrower data from each said prospective borrower;

determining when said lender data from a prospective lender matches borrower data from a prospective borrower to identify a user counterpart match, where matching occurs when the values of said lender data equal the values of said borrower data or when said lender data or said borrower data is within the range of acceptable value; and providing said lender with a list of borrowers, who have data matching said lender's data;

providing said borrower with a list of lenders, who have data matching said specific borrower's data;

said lender and borrower negotiating terms of loan and completing loan process where terms of loan comprises of loan amount, period, rate of interest, collateral, collateral amount, type of collateral, mix of collateral, number of calls to be made, calls for top up, foreclosure, foreclosure penalty, validity period, collateral availability, mode of payment; and said lender and borrower adding new mutually agreed terms of loan for negotiation with counterparties, where both lenders and borrowers are consumers.

25. The method of claim 24, further comprising the step of storing said borrower data.

26. The method of claim 24, further comprising the step of storing said lender data.

27. The method of claim 24, further comprising the step of facilitating communication between each said prospective borrower with one or more of said prospective lenders whose lender data matches with the borrower data of said prospective borrower, wherein said communication includes loan application negotiation, and completion of the loan application process.

28. The method of claim 24, further comprising the step of facilitating communication between each said prospective lender with one or more of said prospective borrowers whose borrower data matches with the lender data of said prospective lender, wherein said communication includes loan application negotiation, and completion of the loan application process.

29. The method of claim 24, further comprising the step of transferring loan funds from said prospective lender to said prospective borrower.

30. The method of claim 24, further comprising the step of transferring said collateral from said prospective borrower to a user collateral account.

31. The method of claim 24, further comprising the step of escrowing said collateral and returning said collateral to said prospective borrower upon expiration of the loan, and alternatively forwarding said collateral to said prospective lender in the event of a loan default.

32. The method of claim 31, further comprising the step of evaluating the value of said collateral.

33. The method of claim 32, further comprising the step of informing said counterparts if said collateral value is less than said collateral value requirement.

34. The method of claim 31, further comprising the step of receiving a collateral value requirement as agreed to by said lender and said borrower.

35. The method of claim 34, further comprising the step of requesting said borrower to deposit funds to replenish the reduction in said collateral value below said collateral value requirement.

36. The method of claim 24, further comprising the step of transmitting counterpart loan data to each user whose respective data results in a user counterpart match.

37. The method of claim 24, further comprising the step of suspending the matching analysis of the loan data pertaining to a user upon request by the said user.

38. The method of claim 24, further comprising the step of evaluating the availability and value of the collateral offered by said prospective borrower.

39. The method of claim 24, further comprising the step of receiving loan payments from said borrower and transferring funds equal to said loan payments to said lender.

40. The method of claim 24, further comprising the step of foreclosing on the loan upon the request from one or more counterparts.

41. The method of claim 40, further comprising the step of matching the counterparts of the foreclosed loan with other counterparts.

42. The method of claim 24 wherein said loan is selected from the group consisting of capital, equities, or debt.

43. The method of claim 19, wherein said matching function comprises a buyer aggregation model.

44. The method of claim 24 further comprising querying said matched borrower and said matched lender if a rollover loan is desired on the same terms or on new terms.

45. The method of claim 24 further comprising storing match data.

46. The method of claim 24 further comprising monitoring when loan proceeds are due, receiving said loan proceeds into an escrow account and transferring said loan proceeds to a lender.

* * * * *